United States Patent
Hehle et al.

(10) Patent No.: US 8,265,810 B2
(45) Date of Patent: Sep. 11, 2012

(54) METHOD FOR AUTOMATICALLY CONTROLLING THE SPEED OF A SHIP

(75) Inventors: Marc Hehle, Constance (DE); Hans-Gerd Freisem, Uhldingen (DE); Olaf Kammertoens, Dunkirk (FR)

(73) Assignee: MTU Friedrichshafen GmbH, Friedrichshafen (DE)

( * ) Notice: Subject to any disclaimer, the term of this patent is extended or adjusted under 35 U.S.C. 154(b) by 519 days.

(21) Appl. No.: 12/499,991

(22) Filed: Jul. 9, 2009

(65) Prior Publication Data

US 2010/0076632 A1  Mar. 25, 2010

(30) Foreign Application Priority Data

Jul. 9, 2008  (DE) .......................... 10 2008 032 394

(51) Int. Cl.
*B60L 3/00* (2006.01)
*B60L 15/00* (2006.01)
*B60L 9/00* (2006.01)
*B60L 11/00* (2006.01)

(52) U.S. Cl. .............. 701/21; 701/1; 701/400; 701/408; 701/409; 114/312; 114/337; 114/1; 114/55.5; 114/275; 74/2; 74/3; 74/3.2

(58) Field of Classification Search .................. 74/2, 3, 74/3.2; 701/1, 21, 208; 340/984; 342/357; 367/909, 99, 128

See application file for complete search history.

(56) References Cited

U.S. PATENT DOCUMENTS

| 4,232,903 | A  | * | 11/1980 | Welling et al. ..................... 299/8 |
|---|---|---|---|---|
| 4,513,378 | A  | * | 4/1985 | Antkowiak .................... 701/217 |
| 4,538,230 | A  | * | 8/1985 | Reust et al. ........................ 701/8 |
| 4,646,244 | A  | * | 2/1987 | Bateman et al. .............. 701/301 |
| 6,185,496 | B1 | * | 2/2001 | Matsuno .......................... 701/70 |
| 6,611,737 | B1 | * | 8/2003 | El-Tahan et al. ................. 701/21 |
| 6,734,808 | B1 | * | 5/2004 | Michaelson et al. .......... 340/984 |
| 6,750,815 | B2 | * | 6/2004 | Michaelson et al. ...... 342/357.31 |
| 2003/0112171 | A1 | * | 6/2003 | Michaelson et al. ............ 342/41 |
| 2006/0089794 | A1 | * | 4/2006 | DePasqua ..................... 701/208 |
| 2007/0265759 | A1 | * | 11/2007 | Salinas et al. ................... 701/93 |
| 2009/0271054 | A1 | * | 10/2009 | Dokken ........................... 701/21 |

FOREIGN PATENT DOCUMENTS

DE  32 30 621  2/1984

\* cited by examiner

*Primary Examiner* — Khoi Tran
*Assistant Examiner* — Bhavesh V Amin
(74) *Attorney, Agent, or Firm* — Lucas & Mercanti, LLP; Klaus P. Stoffel

(57) ABSTRACT

A method for automatically controlling the speed of a ship, in which the engine speed (nMOT) is automatically controlled by a closed-loop engine speed control system as an inner closed-loop control system, the ship's speed (vS) is automatically controlled by a closed-loop ship's speed control system as an outer closed-loop control system, and the ship's set speed (vSL) is influenced as a reference input of the closed-loop ship's speed control system as a function of an external signal source. The ship's set speed (vSL) is corrected as a function of the underwater topography (TOPO).

7 Claims, 4 Drawing Sheets

METHOD FOR AUTOMATICALLY CONTROLLING THE SPEED OF A SHIP

BACKGROUND OF THE INVENTION

The invention concerns a method for automatically controlling the speed of a ship.

The power requirement of an inland ship propulsion system depends primarily on the draft, the water level and the running speed. The navigator predetermines the course by way points, and the desired arrival time is set. A power plant controller then uses the setpoint values to compute a constant desired average speed.

To maintain a time program predetermined by the navigator with the smallest possible amount of fuel consumption, DE 32 30 621 C2 proposes that the ship's speed be monitored by means of a cascaded closed-loop control system, in which a closed-loop control system for the ship's speed constitutes the external closed-loop control system. The correcting variable of the closed-loop control system for the ship's speed is simultaneously the reference input of a subordinate, internal closed loop control system for the engine speed. The ground speed is measured as the controlled variable of the closed-loop control system for the ship's speed. The reference input of the closed-loop control system for the ship's speed, i.e., the set ship's speed, is adapted to external influences, for example, to the contours of the shore panorama via a radar transmitter-receiver or to upstream or downstream travel. With this type of structure of the closed-loop control system, the suction of the ship with too little water under the hull causes a lower ship's actual speed and thus brings about a corresponding ship's speed control deviation. The ships speed controller responds to this by increasing the engine set speed. An increased engine set speed in turn causes increased fuel consumption, so that the automatic control system is not yet optimal in all operating states.

SUMMARY OF THE INVENTION

Therefore, the objective of the invention is to further optimize the previously described method with respect to fuel consumption.

The invention adapts the ship's speed to the underwater topography by correcting the ship's set speed as a reference input of the closed-loop control system for the ship's speed as a function of the topography of the waterway. The underwater topography is stored an electronic river chart in a power plant controller, from which the water depth can be determined. Alternatively, the electronic river chart can also be stored in the electronic engine control unit. With increasing water depth, the ship's set speed is increased; on the other hand, with decreasing water depth, the ship's set speed is decreased.

The central idea of the invention is forward-looking travel planning, in which different ship's set speeds are predictively preset between the way points, taking the underwater topography into consideration. The required average speed is thus achieved by presetting a lower ship's set speed in the shallow water and a higher ship's set speed in the deep water. The result is still further reduced fuel consumption, since the effect of the "suction" can be clearly assigned to a shallow water zone. Automatic adjustment of the ship's speed to legal requirements, such as speed limits in certain sections of the river, is also an advantage, since it relieves the navigator of this burden.

To allow better assessment of the situation, a reserve time is displayed to the navigator. A reserve time means that the destination is reached at the desired arrival time with fuel-optimized operation. An unsafe reserve time indicates that the arrival time cannot be reached with the default values that have been preset and therefore that the navigator must correct the default values. The reserve time is computed by computing, in a first step, the distance on the basis of the desired arrival time and the way points, and then using this to compute a desired average speed. In a second step, the ship's set speed for a partial distance between two way points is computed and corrected on the basis of the underwater topography. In a third step, this is performed iteratively for the other partial distances. In a fourth step, the corrected ship's set speeds are then summed, and the sum is related to the desired average speed.

A self-adaptive, learning method is realized by storing the corrected ship's set speed, the theoretically computed fuel consumption and the actual fuel consumption as a function of the underwater topography, and then when the same route is traveled again, these learned values enter adaptively into the determination of the ship's set speed. Other variables that affect fuel consumption, such as wind velocity, could also be measured, stored and used to refine the prediction. All together, the ever more precise adaptation of the system to the given circumstances is advantageous.

DETAILED DESCRIPTION OF THE INVENTION

Figure 1:
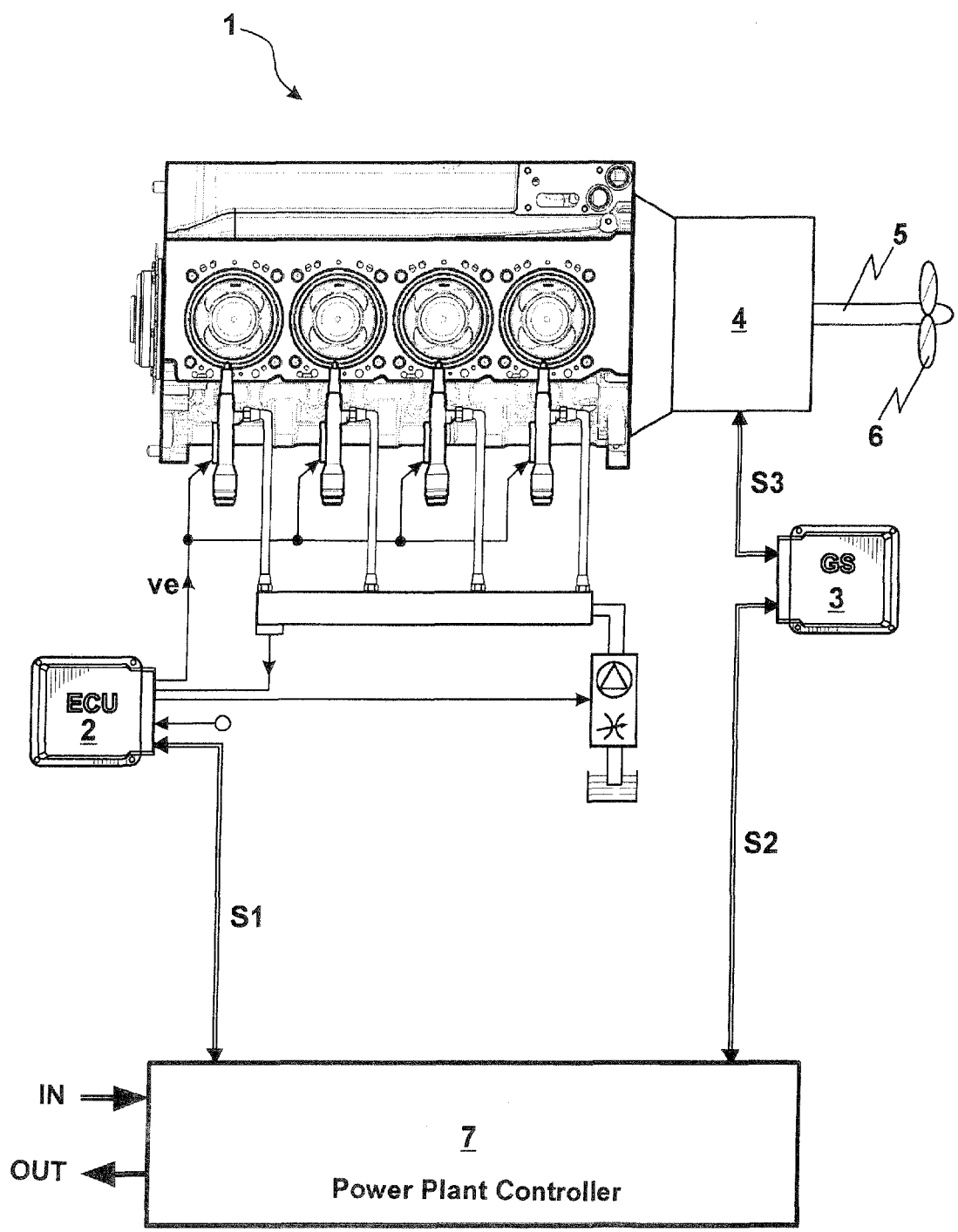
FIG. 1 shows a system diagram.

FIG. 1 shows a system diagram of a ship's propulsion system, which comprises the following mechanical units: an internal combustion engine 1, a transmission 4, an output shaft 5, and a propeller 6, for example, a variable-pitch propeller. In the internal combustion engine 1 shown here, the fuel is injected by a common rail system, whose design and functionality are well known. The operating point of the internal combustion engine 1 is determined by an electronic engine control unit (ECU) 2 as a function of the input variables IN via suitable control signals, for example, via a signal ve that characterizes the start/end of injection. The electronic engine control unit 2 communicates with the power plant controller 7 via a signal path S1. A graphic interface is installed on the power plant controller 7. The navigator inputs his requirements and receives displays of all information via this graphic interface. The navigator presets especially the draft/trim, the travel data and the desired arrival time, the travel distance on the basis of the way points, the water levels, the expected flow rate between the way points, and the expected wind velocity. The power plant controller receives the current position via GPS and the current water depth by echo sounding as additional variables. These data are updated during the entire operation. The arrival time and the travel distance are further processed in the power plant controller 7. The P/V curves for different water levels and loading states as well as the historical data about distances that have already been traveled are stored in the power plant controller 7. If the electronic river chart has been recorded in the power plant controller 7 via the underwater topography, then the power plant controller 7 outputs the ship's set speed to the electronic engine control unit 2 by the signal path S1.

An electronic transmission control unit (GS) 3 determines the switching state of the transmission, for example, forward/reverse travel or trolling, via a signal path S3. The actuator and sensor signals of the transmission 4 are reported back to the electronic transmission control unit 3 by the same signal path S3. The electronic transmission control unit 3 communicates with the power plant controller 7 via a signal path S2.

Figure 2:
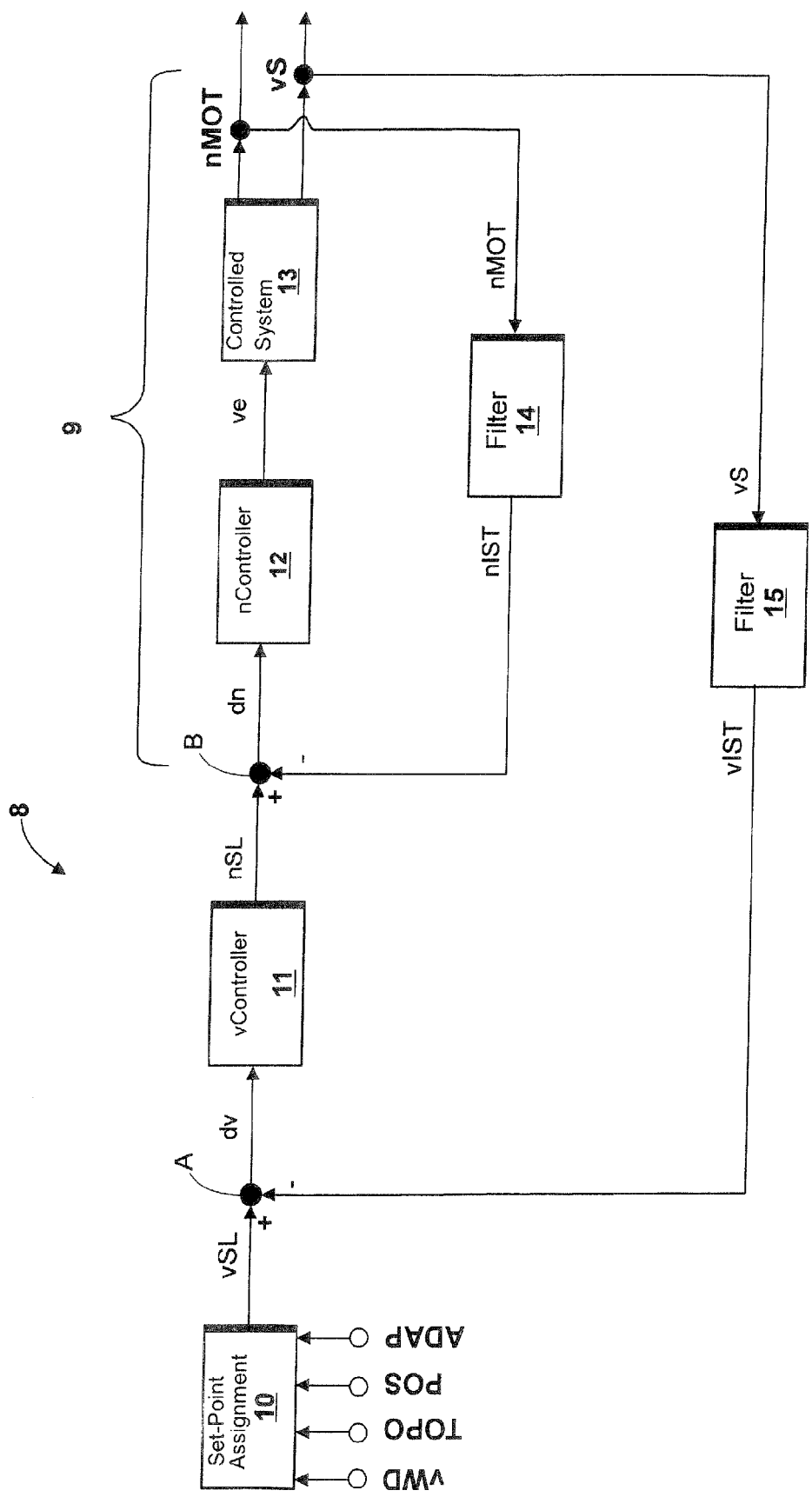
FIG. 2 shows a cascaded closed-loop control system.

FIG. 2 shows a cascaded closed-loop control system that consists of a closed-loop ship's speed control system 8 as the outer closed-loop control system and a closed-loop engine speed control system 9 as the subordinate, inner closed-loop control system. A cascaded closed-loop control system is characterized by the fact that the correcting variable of the outer closed-loop control system is simultaneously the reference input of the inner closed-loop control system. The input variables of the closed-loop control system are the underwater topography TOPO, the current position POS, an adaptation variable ADAP, and the desired average speed vWD. The underwater topography TOPO is stored as an electronic river chart in the power plant controller or, alternatively, in the electronic engine control unit. The current position POS is processed in the power plant controller on the basis of the GPS signals. The adaptation variable ADAP corresponds to the learned ship's speed set values of an earlier trip on the same segment of the route. The desired average speed vWD is computed from the arrival time and the total distance. The output variables of the closed-loop control system are the raw values of the engine speed nMOT and the raw values of the ship's speed vS, which is determined from a ship's log. A setpoint assignment unit 10 determines a ship's set speed vSL on the basis of the input variables. At a point A, this value is compared with the ship's actual speed vIST, from which a ship's speed control deviation dv is obtained. A ship's speed controller 11 with at least PI action then uses the ship's speed control deviation dv to determine the correcting variable, here a set engine speed nSL. The set engine speed nSL is the reference input of the closed-loop engine speed control system 9. At a point B, the set engine speed nSL is compared with the actual engine speed nIST. This corresponds to an engine speed control deviation dn, which is converted to a correcting variable ve by an engine speed controller 12. The engine speed controller is typically realized as a PIDT1 controller. The correcting variable ye is the input variable for the controlled system, where this is represented as the total controlled system 13. Therefore, the total controlled system 13 comprises the internal combustion engine 1, the transmission 4, the output shaft 5, and the propeller 6.

The raw value of the engine speed nMOT is one of the output variables of the total controlled system 13 and in a cascaded closed-loop control system corresponds to the indirectly controlled variable. The raw values of the engine speed nMOT are filtered by a filter 14, for example, a two-revolution filter, and fed back to point B as the actual engine speed nIST. The inner closed-loop control system is thus closed. The raw value of the ship's speed vS is the second output variable of the total controlled system 13 and in a cascaded closed-loop control system corresponds to the controlled variable. The raw values of the ship's speed are filtered by a filter 15 and fed back to point A as the ship's actual speed vIST. The outer closed-loop control system is thus closed as well.

Figure 3:
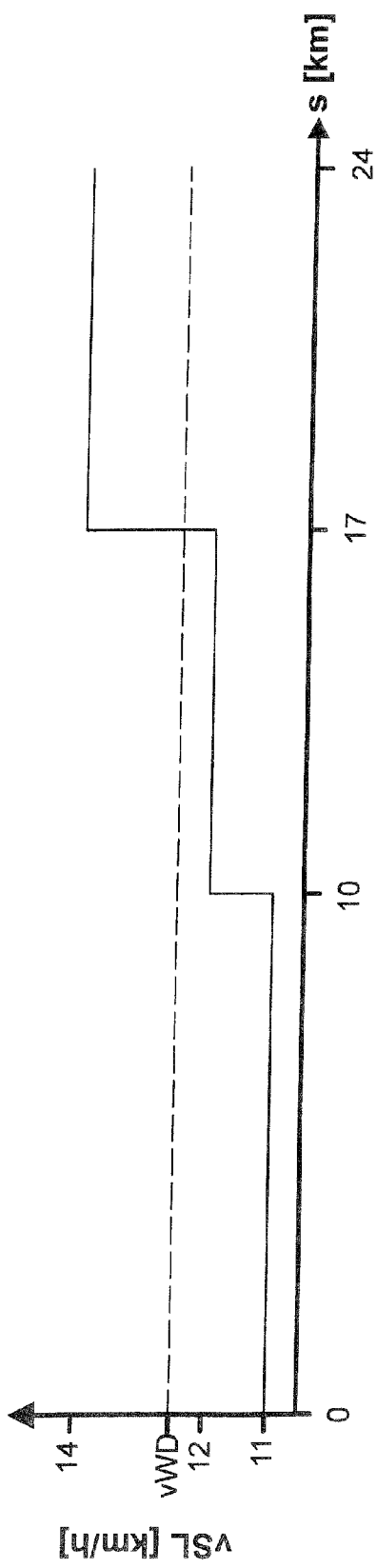
FIG. 3 shows the ship's set speed over distance
Figure 4:
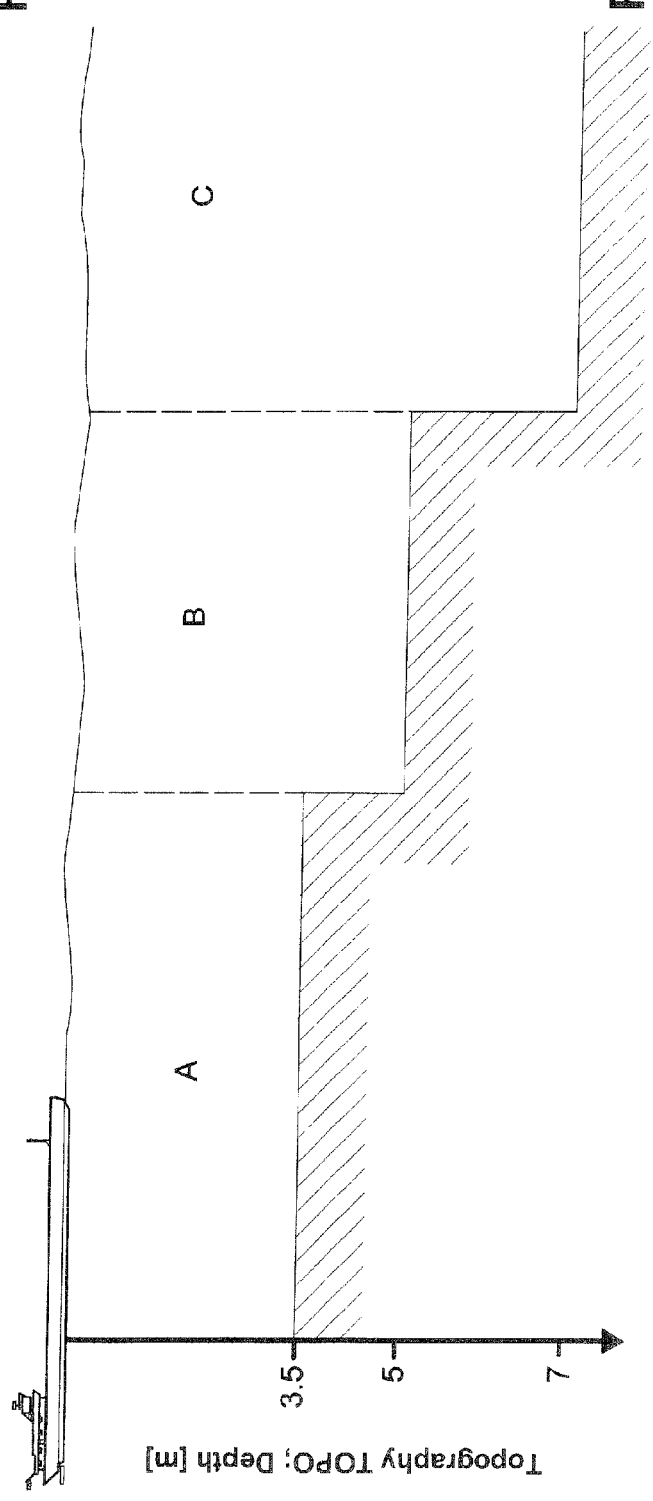
FIG. 4 shows the underwater topography/depth over distance.

FIG. 3 is a graph of the ship's set speed vSL over distance s. FIG. 4 corresponds to FIG. 3 and is a graph that shows the underwater topography TOPO and thus the depth below the ship over the same distance s. The following description applies to both figures. In FIG. 3, the broken line represents a desired average speed vWD of, for example, 12.5 km/h, which is one of the input variables of the closed-loop control unit described above. The central idea of the invention is the correction of the ship's set speed vSL as a function of the underwater topography TOPO. In a segment of the route with low depth, a so-called shallow water zone, the ship's set speed vSL is reduced. In a segment of the route with greater depth, a so-called deep water zone, the ship's set speed vSL is increased.

In a first segment of the route A of distance s (range 0-10 km), the depth is only 3.5 m. The ship's set speed vSL is corrected to a lower ship's set speed vSL, here: 11 km/h, by the setpoint assignment unit (reference number 10 in FIG. 2) on the basis of the underwater topography TOPO. In the first segment of the route A, the ship's set speed vSL is below the desired average speed vWD. In a second segment of the route B (range 10-17 km), which has a depth of 5 m, the ship's set speed vSL is also reduced, here: 12 km/h. Only in a third segment of the route C (range greater than 17 km), is the ship's set speed vSL raised above the desired average speed vWD, since the depth is now sufficiently great, here: 7 m, and suction of the ship no longer occurs.

As the two figures clearly show, knowledge of the underwater topography via the electronic river chart is critically important with respect to the reduction of the fuel consumption. The electronic river chart presents the possibility of predictive adaptation of the ship's speed by compensating a lower running speed in a shallow water zone by a higher running speed in a deep water zone. Since the engine output remains constant during this operation, the fuel consumption is still further reduced compared to the prior art.

To allow better assessment of the situation, a spare time is displayed to the navigator. A safe spare time means that the destination is reached at the desired arrival time with fuel-optimized operation. An unsafe spare time indicates that the arrival time cannot be reached with the default values that have been preset and therefore that the navigator must correct the default values. The spare time is computed by computing, in a first step, the distance on the basis of the desired arrival time and the way points, and then using this to compute a desired average speed. In a second step, the ship's set speed for a partial distance between two way points is computed and corrected on the basis of the underwater topography. In a third step, this is performed iteratively for the other partial distances. In a fourth step, the corrected ship's set speeds are then summed, and the sum is related to the desired average speed.

Figure 5:
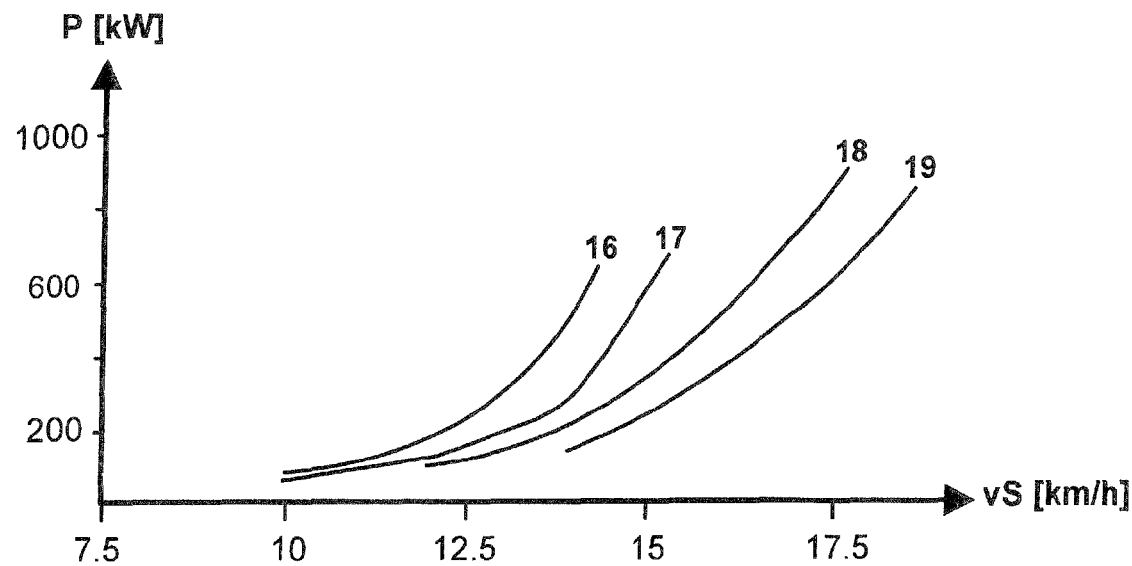
FIG. 5 shows a graph of engine output over ship's speed.

FIG. 5 shows a graph of the engine output P versus the ship's speed vS as a function of the ship's draft and the water depth. A first line 16 characterizes the power requirement of a ship with a draft x0 at a water depth y0. A second line 17 characterizes the same ship (draft=unchanged) at a water depth y1. The second line 17 differs from the first line 16 by the variation of the water depth, where y1>y0. A third line 18 characterizes the power requirement of a ship with a draft x1 at a water depth y0. A fourth line 19 characterizes the same ship (draft=unchanged) at a water depth y1. The fourth line 19 differs from the third line 18 by the variation of the water depth, where y1>y0. With respect to the draft, x1<x0. It can be qualitatively derived from the characteristic curves, for example, in a comparison of the first line 16 and the second line 17, that at a greater water depth, a lower engine power P is necessary to achieve the same ship's speed vS.

Figure 6:
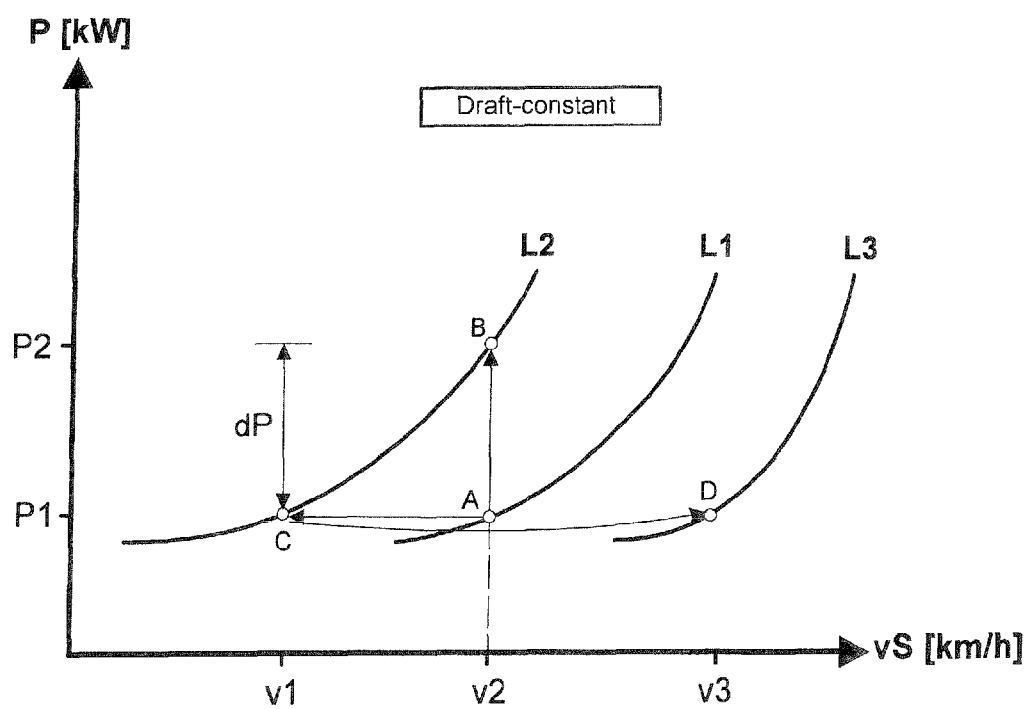
FIG. 6 shows a segment of the graph of FIG. 5.

FIG. 6 shows a segment of FIG. 5 but with the draft of the ship held constant. The prior-art method proceeds as follows: At an operating point A, the ship runs at a constant ship's speed v2. Operating point A is defined by the pair of values v2/P1 and lies on the line L1, which stands for the first water depth. The setpoint value of the closed-loop ship's speed control system remains constant. A lower water depth causes suction of the ship and brings about a decreasing ship's actual speed. This results in an increasing control deviation for the ship's speed, to which the ship's speed controller responds by increasing its correcting variable, i.e., the set engine speed. The engine speed controller responds to an increased set engine speed by increasing its correcting variable, which finally results in the injection of more fuel. Therefore, operating point A changes in the direction of operating point B, which is defined by the pair of values v2/P2. Operating point B lies on a line L2 with lower water depth than line L1. This results in an increased power requirement, which in turn results in increased fuel consumption.

The method according to the invention proceeds as follows: the power plant controller recognizes a decreasing water depth on the basis of the underwater topography. The lesser water depth also causes suction of the ship here. However, due to the stored electronic river chart, the ship's set speed is reduced by the setpoint assignment unit 10 in FIG. 2, so that at constant engine output, here: P1, the ship's speed vS changes from operating point A in the direction of operating point C. Operating point C is defined by the pair of values v1/P1 and lies on the line L2, which stands for a lower water depth than L1. If the power plant controller recognizes a deep water zone, line L3, the ship's set speed vSL is raised again, so that the ship's speed vS increases at unchanged engine output. Therefore, operating point C changes in the direction of operating point D, which is defined by the pair of values v3/P1.

A comparison of the two methods on the basis of the operating points clearly shows that knowledge of the underwater topography contributes decisively to the reduction of fuel consumption, since a lower running speed in a shallow water zone is compensated by a higher running speed in a deep water zone, and this occurs at constant engine output. This savings potential is indicated in indicated by the symbol dP in FIG. 6.

The special advantage of the method is that the underwater topography for the approaching sections of the river is known from the electronic river chart, and therefore, a forward-looking adjustment of the ship's speed can be used to optimize fuel consumption.

Although the present invention has been described in relation to particular embodiments thereof, many other variations and modifications and other uses will become more apparent to those skilled in the art. It is preferred, therefore, that the present invention be limited not by the specific disclosure herein, but only by the appended claim.

The invention claimed is:

1. A method for automatically controlling speed of a ship, comprising the steps of:

automatically controlling engine speed (nMOT) by a closed-loop engine speed control system as an inner closed-loop control system;
  automatically controlling the ship's speed (vS) by a closed-loop ship's speed control system as an outer closed-loop control system;
  influencing the ship's set speed (vSL) as a reference input of the closed-loop ship's speed control system as a function of an external signal source;
  determining underwater topography (TOPO) using an electronic river chart; and
  correcting the ship's set speed (vSL) predictively as a function of the underwater topography (TOPO).

2. The method in accordance with claim 1, including increasing the ship's set speed (vSL) with increasing water depth or reducing the ship's set speed (vSL) with decreasing water depth.

3. The method in accordance with claim 2, further including computing a reserve time as follows:

in a first step, computing a desired average speed (vWD) based on distance and a desired arrival time;
  in a second step, computing the ship's set speed (vSL) between two way points and correcting the ship's set speed (vSL) based on the underwater topography (TOPO);
  in a third step, iteratively computing the ship's set speed (vSL) as in the second step for other partial distances;
  in a fourth step, summing the corrected ship's set speeds; and
  in a fifth step, relating the sum to the desired average speed (vWD).

4. The method in accordance with claim 3, including prompting a ship's navigator to correct an arrival time when there is an unsafe reserve time.

5. The method in accordance with claim 1, including storing the corrected ship's set speed (vSL) as a function of the underwater topography, and adjusting the current ship's set speed (vSL) by the stored values of the topography-specific ship's set speed (ADAP) when passage is again made through the same section of the route.

6. The method in accordance with claim 1, including correcting the underwater topography (TOPO) by a current water level.

7. The method in accordance with claim 1, including determining a deviation of a set flow rate from an actual flow rate and/or a deviation of a set water depth from an actual water depth, and determining the ship's set speed (vSL) as a function of the deviation.

* * * * *